United States Patent [19]

Motegi et al.

[11] Patent Number: 5,361,138
[45] Date of Patent: Nov. 1, 1994

[54] METHOD OF COMMUNICATION BETWEEN FACSIMILE APPARATUSES IN OPTIMUM COMMUNICATION MODE AND FACSIMILE APPARATUS FOR REALIZING THE SAME

[75] Inventors: Chiaki Motegi; Kiyoshi Kobayashi, both of Tokyo, Japan

[73] Assignee: Kabushiki Kaisha Toshiba, Kawasaki, Japan

[21] Appl. No.: 37,694

[22] Filed: Mar. 25, 1993

Related U.S. Application Data

[63] Continuation of Ser. No. 950,722, Sep. 25, 1992, abandoned, which is a continuation of Ser. No. 829,524, Feb. 3, 1992, abandoned, which is a continuation of Ser. No. 701,001, May 13, 1991, abandoned, which is a continuation of Ser. No. 554,987, Jul. 17, 1990, abandoned, which is a continuation of Ser. No. 244,069, Sep. 14, 1988, abandoned.

[30] Foreign Application Priority Data

Sep. 14, 1987 [JP] Japan ................... 62-230014

[51] Int. Cl.$^5$ ................................. H04N 1/00
[52] U.S. Cl. ......................... 358/400; 358/404; 358/405
[58] Field of Search ............. 358/400, 401, 405, 406, 358/407, 438, 439, 434, 435, 436, 404

[56] References Cited

U.S. PATENT DOCUMENTS

4,583,124  4/1986  Tsuji ................... 358/257
4,746,986  5/1988  Tanigawa ............. 358/256

FOREIGN PATENT DOCUMENTS

5680955    7/1981  Japan ................... 358/426
60-119169  2/1985  Japan .
62-204654  9/1987  Japan ................... H04N 1/00
63-152264  6/1988  Japan ................... H04N 1/00
1311738   12/1989  Japan ................... 358/405

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

A facsimile apparatus comprises a memory for storing communication mode information, a setting unit for setting a communication mode, and a data transmitting unit for transmitting image data in accordance with the set communication mode. The setting unit checks in response to an input transmission start instruction whether a destination facsimile apparatus is a new receiving side. If the destination facsimile apparatus is determined to be a new receiving side, the setting unit receives the communication mode information from the destination facsimile apparatus and stores the received communication mode information in the memory. If the destination facsimile apparatus is determined not to be a new receiving side, the setting unit reads out the communication mode information from the memory and transmits the readout communication mode information to the destination facsimile apparatus. The setting unit receives changed communication mode information transmitted from the destination facsimile apparatus in response to transmission of the readout communication mode information and stores the changed communication mode information in the memory. The communication mode is set in accordance with one of the changed communication mode information, the readout communication mode information, and the received communication mode information.

3 Claims, 5 Drawing Sheets

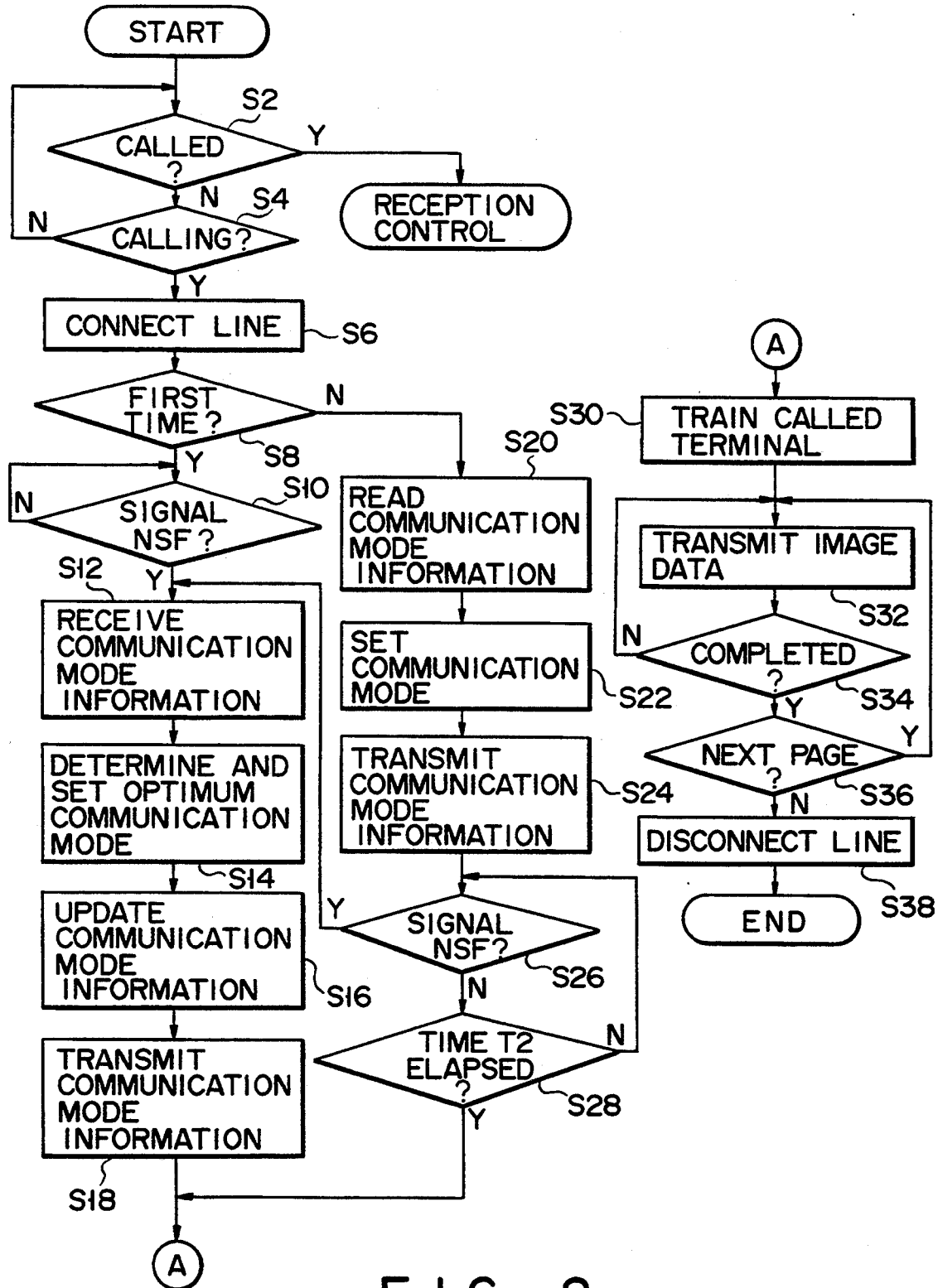
F I G. 2

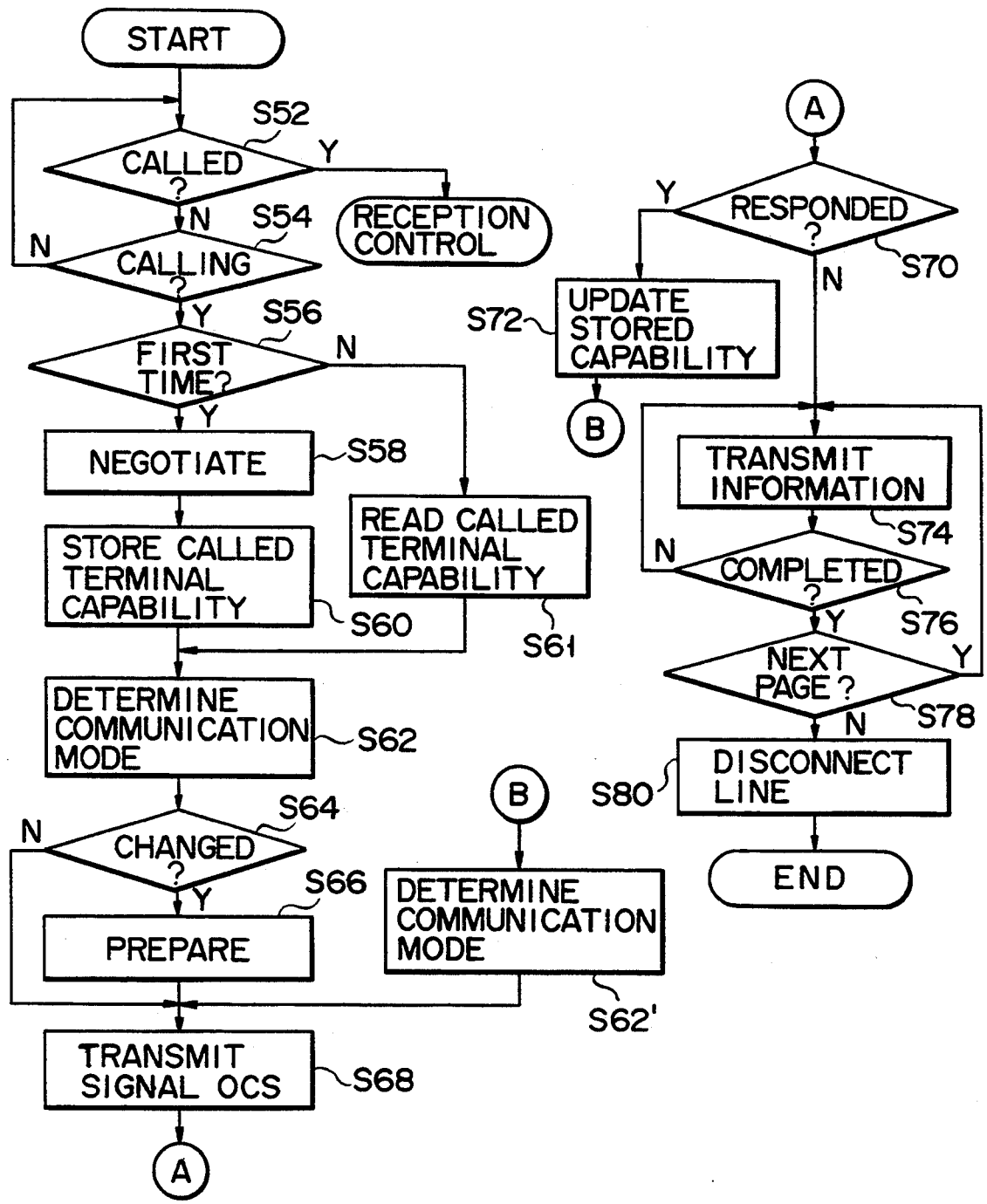
F I G. 6

METHOD OF COMMUNICATION BETWEEN FACSIMILE APPARATUSES IN OPTIMUM COMMUNICATION MODE AND FACSIMILE APPARATUS FOR REALIZING THE SAME

This application is a continuation of application Ser. No. 07/950,722, filed on Sep. 25, 1992, now abandoned, which was a continuation of 07/829,524, filed on Feb. 3, 1992, now abandoned, which was a continuation of 07/701,001 filed on Jun. 13, 1991, now abandoned, which was a continuation of 07/554,987, filed on Jul. 17, 1990, now abandoned, which was a continuation of 07/244,069, filed on Sep. 14, 1988, now abandoned.

BACKGROUND OF THE INVENTION

1. Field of the Invention

The present invention relates to a method of communication between facsimile apparatuses in accordance with their communication capabilities and a facsimile apparatus for realizing the same.

2. Description of the Related Art

Recently, along with the trend of office automation, a large number of facsimile apparatuses have been used. Some facsimile apparatuses have a learning function and can perform high-speed communication by an abbreviated sequence between specific apparatuses regardless of a predetermined sequence.

In a system of this type, communication mode information such as MF, GII, and GIII of a facsimile apparatus at a destination side, i.e., a called terminal is input by an operator or determined by actually performing communication. The input or determined communication mode information is stored in a memory of a calling facsimile apparatus. When the same terminal is called again, a communication control sequence is set in accordance with the communication mode information read out from the memory. Then, communication control is performed between the calling and called terminals in accordance with the set communication control sequence.

However, in such a facsimile apparatus, after an optimum communication mode between calling and called terminals is determined and the determined communication mode information is stored in a memory, a determination sequence of communication mode information is not performed between the calling and called terminals from the next calling, and communication control is started simultaneously with the calling, in accordance with the communication mode information stored in the memory. Therefore, even if a communication mode of the called terminal is changed, for example, communication control is performed in accordance with the previous communication mode information stored in the memory. For this reason, even if a communication capability is changed to use a high-performance communication mode, communication control is undesirably performed in accordance with the previous communication mode information.

SUMMARY OF THE INVENTION

The present invention has been made in consideration of the above situation and has as its object to provide a method of communicating image data in an optimum communication mode even if a communication capability between source and destination facsimile apparatuses is changed and a facsimile apparatus for realizing the same.

In order to achieve the above object, the facsimile apparatus comprises a memory for storing communication mode information, a setting unit for setting the optimum communication mode.

The setting unit responsive to an input transmission start instruction, sets the optimum communication mode from one of the communication mode information stored in the memory, the communication mode information received from the destination facsimile apparatus, and updated communication mode information received from the destination facsimile apparatus in response to transmission of the stored communication mode information. The setting unit also stores the received communication mode information in the memory.

In order to achieve the above object, the method comprises checking in a source facsimile apparatus in response to a transmission start instruction whether communication with a destination facsimile apparatus is for first time;
- selectively receiving communication capability information from said destination facsimile apparatus in accordance with the checked result to store the received communication capability information in a memory;
- selectively reading out the stored communication capability information from said memory to transmit the readout communication capability information to said destination facsimile apparatus in accordance with the checked result;
- selectively receiving destination changed communication capability information from said destination facsimile apparatus in response to transmission of source changed communication capability information to store the destination changed communication capable information in the memory to update the stored the communication capability information;
- setting the optimum communication mode from one of the received communication capability information and the readout communication capability information, in response to the transmission start instruction; and
- transmitting the image data in accordance with the set communication mode.

As described above, the facsimile apparatus according to the present invention has a learning function about a communication capability of a called terminal. Therefore, even if a communication mode of the called terminal is changed, the stored communication capability of the called terminal can be updated as needed to always perform communication in an optimum communication mode. In addition, if communication capabilities of both calling and called terminals are improved, communication can be rapidly performed with a higher capability.

BRIEF DESCRIPTION OF THE DRAWINGS

FIG. 2 is a flow chart for explaining an operation of the first embodiment;

FIG. 6 is a flow chart for explaining an operation of a third embodiment.

DETAILED DESCRIPTION OF THE PREFERRED EMBODIMENTS

A facsimile apparatus according to the present invention will be described below with reference to the accompanying drawings.

First, referring to FIG. 1, an arrangement of a first embodiment of the facsimile apparatus according to the present invention will be described.

Figure 1:
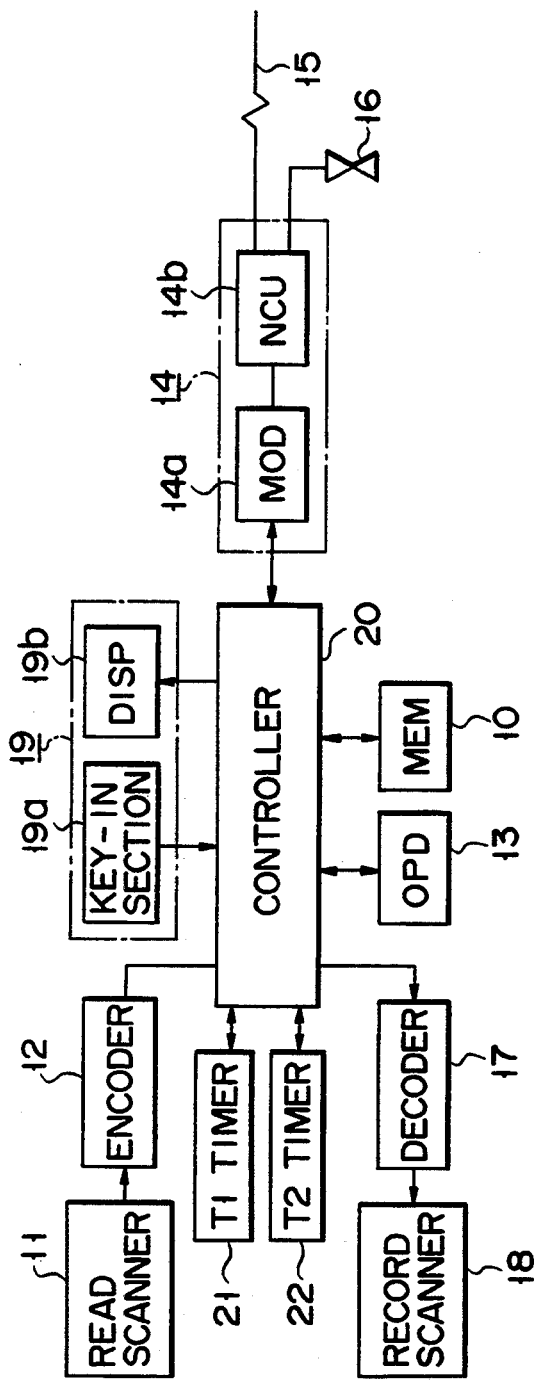
FIG. 1 is a block diagram showing an arrangement of a first embodiment of a facsimile apparatus according to the present invention.

In FIG. 1, read scanner 11 subscans and reads transmission originals set on an original table (not shown) one by one. A read image data signal is encoded by encoder 12 and supplied to transceiver 14 through controller 20. Transceiver 14 includes modulating-/demodulating unit MOD 14a and network controller NCU 14b. The encoded image data signal is modulated by MOD 14a and sent as modulated image data to line 15 such as a subscriber line through NCU 14b. Telephone set 16 and the facsimile apparatus are alternately connected to line 15 by NCU 14b.

When the modulated image data is incoming through line 15, it is received by NCU 14b, demodulated by MOD 14a, and then supplied to decoder 17 through controller 20. The image data signal decoded by decoder 17 is output to record scanner 18 and record-scanned on recording paper. The apparatus of the present invention also comprises scanning panel 19 including key-in section 19a having dial keys and various function keys and display 19b such as a liquid crystal display, timers 21 and 22 for measuring times T1 and T2, and memory 10. Memory 10 stores communication mode information representing a previous communication mode of the called terminal and telephone number information of an already registered called terminal. The apparatus of the present invention also comprises dial pulse generator OPD 13 for generating and sending a dial pulse to line 15 in accordance with the telephone number information stored in memory 10 in abbreviated dial calling.

An operation of the first embodiment will be described below with reference to FIGS. 2 and 3. In the following description, assume that calling is performed with respect to a called terminal having a GIII mode.

Figure 3A:
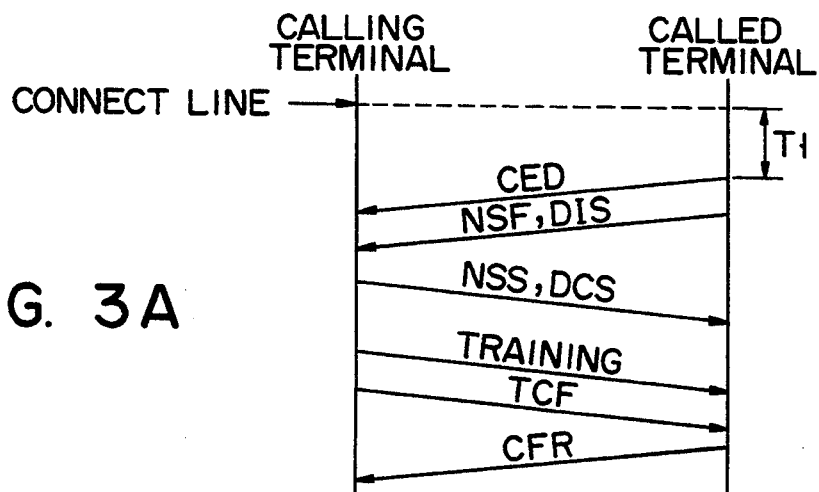
FIGS. 3A to 3C are sequence diagrams for explaining the operation of the first embodiment.

When communication is started, controller 20 repeatedly checks in steps S2 and S4 shown in FIG. 2 whether called or calling communication is to be performed. If the communication is determined to be called in step S2, reception control similar to an operation of the called terminal to be described below is performed. If calling communication is to be performed, Y (YES) is determined in step S4, and step S6 is executed. In step S6, line 15 is connected between the calling and called terminals as shown in FIG. 3A. Timer 22 starts measurement of time T2 at the calling terminal. At the same time, timer 21 starts measurement of time T1 at the called terminal. In step S8, controller 20 determines whether the called terminal is a new destination terminal using communication mode information stored in memory 10. If Y in step S8, i.e., if the called terminal is determined to be the destination terminal whose communication mode information is not stored in memory 10, step S10 is executed.

In step S10, controller 20 determines whether called station identification signal CED, and non-standard facilities signal NSF in which communication mode information representing a current communication mode of the called terminal is inserted, or digital identification signal DIS are supplied from the called terminal. When these signals are supplied, they are received in step S12. In step S14, the communication mode of the called terminal is checked in accordance with the received communication mode information, and a communication mode to be used in communication between the calling and called terminals is determined and set. Communication mode information representing the communication mode determined in step S14 is stored in memory 10 in step S16. As a result, the communication mode information is updated. Thereafter, in step S18, the determined communication mode information is written on and transmitted by non-standard set-up signal NSS or digital command signal DCS. At the called terminal, a communication mode is set in accordance with the communication mode information written on signal NSS or DCS. The communication mode information is stored in memory 10 of the called terminal. In this manner, an optimum communication mode is set between the calling and called terminals.

When the communication mode is set, a training signal is supplied to the called terminal. Thereafter, training check signal TCF is supplied. When training is completed, the called terminal outputs confirmation-to-receive signal CFR. When signal CFR is received, image data of an original is transmitted in step S32 until completion of transmission is determined in step S34. If transmission is determined to be completed in step S34, whether the next page is present is determined in step S36. If the next page is present, steps S32 and S34 are repeated. If the next page is not present, end-of-message signal EOM which represents completion of the message is transmitted to the called terminal in step S38. Thereafter, the line is disconnected.

When the line is connected in step S6, timer 21 starts measurement of time T1 at the called terminal as described above. When signal NSS or DCS is not transmitted from the calling terminal before time T1 elapses, signal CED is supplied to the calling terminal after time T1 elapses. In this manner, the above processing is executed, and optimum communication mode information can be transmitted.

Figure 3B:
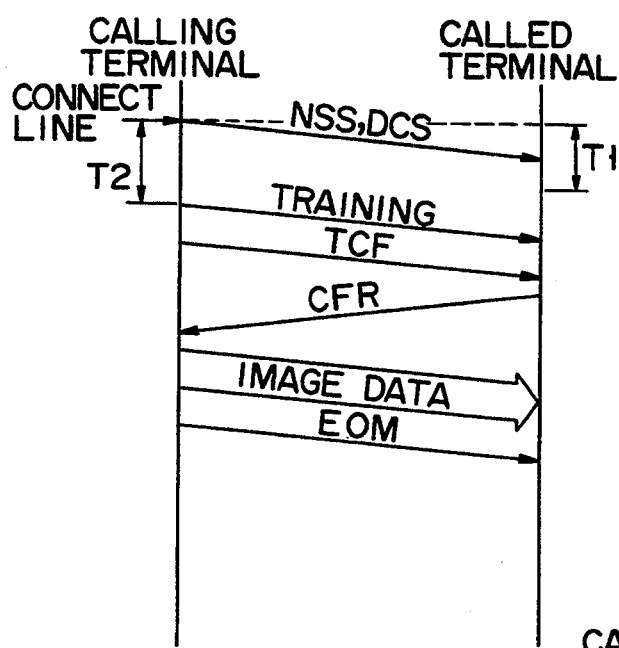

If N (NO) is determined in step S8, i.e., if the called terminal is not a new destination terminal, processing from step S20 is executed as shown in FIG. 3B. In step S20, communication mode information is read out from memory 10 in accordance with telephone number information read out from memory 10 by OPD 13 in accordance with an abbreviated dial number input from key-in section 19a or in accordance with the telephone number information input from key-in section 19a. In step S22, a communication mode is set in accordance with the readout communication mode information. In step S24, the readout communication mode information is transmitted by signal NSS or DCS to the called terminal.

Figure 3C:
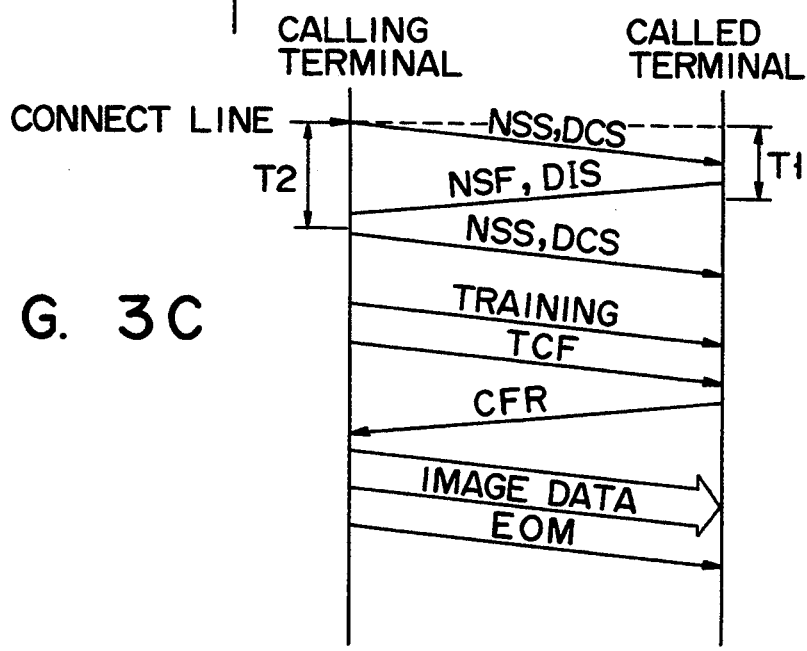

If signal NSS or DCS supplied from the calling terminal is received at the called terminal before time T1 elapses, controller 20 at the called terminal checks whether the communication mode represented by the received communication mode information coincides with the currently set communication mode or communication can be performed in the currently set communication mode. If a coincidence or communication possible is determined, no signal is transmitted from the called to calling terminal. If a noncoincidence and communication impossible are determined, signal NSF or DIS is transmitted from the called to calling terminal as shown in FIG. 3C. In this case, noncoincidence and communication impossible are determined when, e.g., the type of the called terminal is changed and therefore a communication mode is changed.

At the calling terminal, controller 20 checks in steps S26 and S28 whether signal NSF or DIS is supplied from the called terminal before time T2 elapses. If Y in step S26, the flow from step S14 described above is executed. If N in step S26, the processing from S30 is executed.

As described above, according to this embodiment, even in calling performed after communication mode information of a called terminal is stored in a memory, the communication mode information is supplied from the calling to called terminal. The called terminal compares the communication mode represented by the supplied communication mode information with currently set communication mode. If communication is impossible, the called terminal transmits the currently set communication mode information to the calling terminal. Therefore, learning is executed again at the calling terminal, and the communication mode information stored in the memory of the calling terminal is updated.

Therefore, even if the communication mode is changed because the type of the called terminal is changed or the like, the communication mode information stored in the memory can be updated upon calling performed for the first time after changing. Thereafter, communication can be performed in accordance with the updated communication mode information.

In addition, this embodiment can eliminate a drawback that communication cannot be performed because communication modes do not coincide with each other or communication is not performed in an optimum communication mode although the communication could have been performed.

Since signals CED, and NSF or DIS need not be received from the called terminal in which the communication mode information is already stored, a communication time can be shortened. Furthermore, when the communication mode information is received by signal NSS or DCS, the communication mode information is stored in the called terminal. Therefore, when communication is to be performed from the called to calling terminal, signals CED, NSF, and DIS need not be received.

A second embodiment of the facsimile apparatus according to the present invention will be described.

An arrangement of the second embodiment is similar to that of the first embodiment shown in FIG. 1 except that timers 21 and 22 are omitted.

Figure 5:
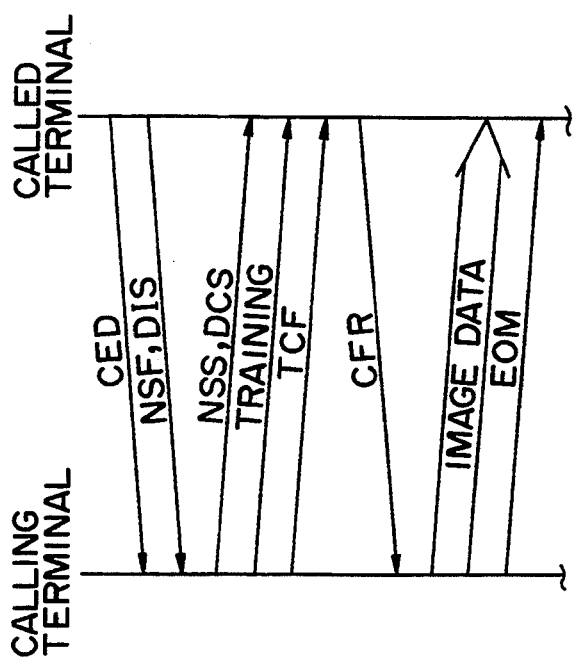
FIG. 5 is a sequence diagram for explaining the operation of the second embodiment.

An operation of the second embodiment will be described with reference to FIGS. 4 and 5.

Figure 4:
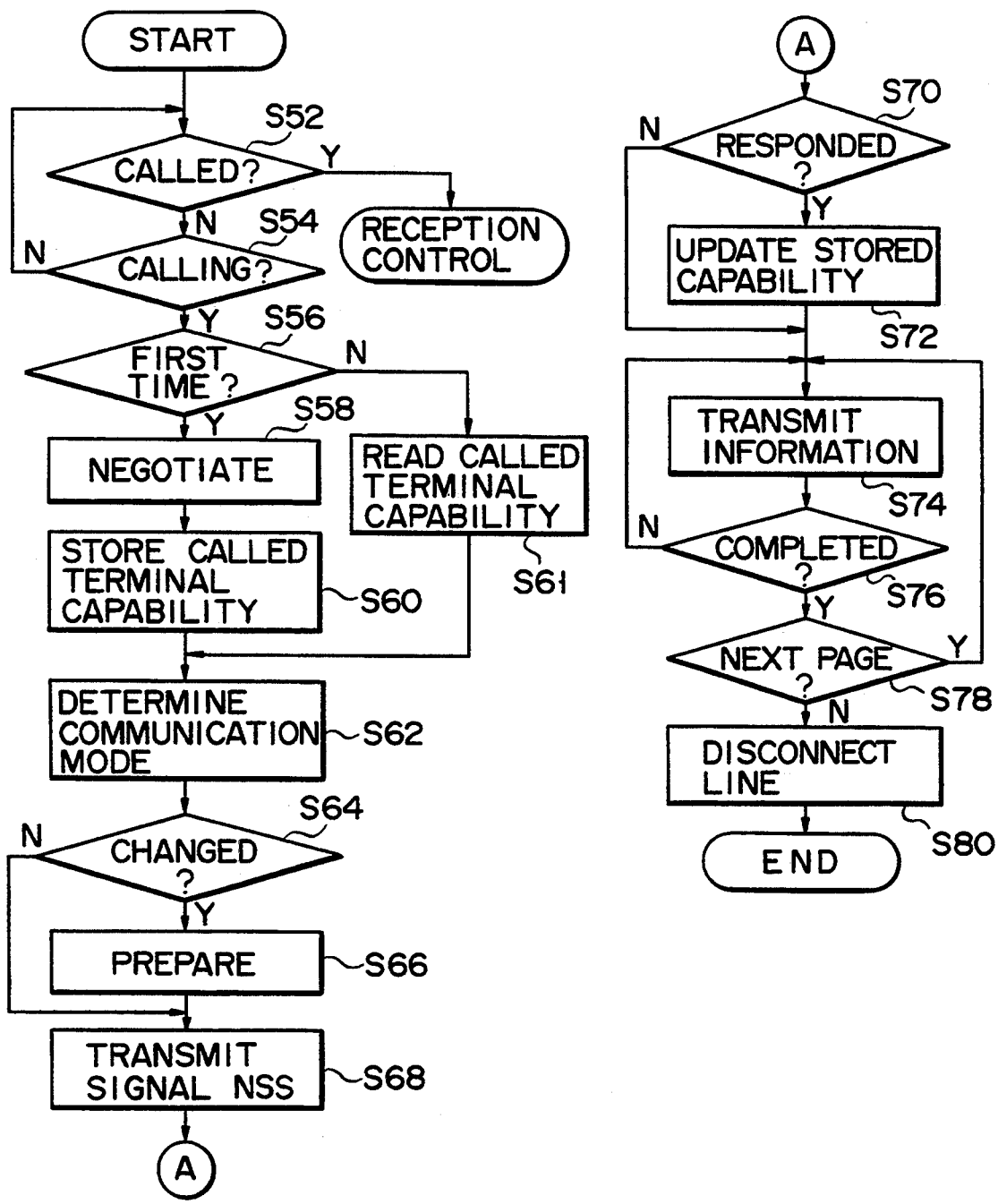
FIG. 4 is a flow chart for explaining an operation of a second embodiment.

When communication is started, controller 20 at the calling terminal repeatedly checks in steps S52 and S54 shown in FIG. 4 whether called or calling communication is to be performed. If the called communication is determined, reception control is performed. If the communication is determined to be calling, controller 20 checks in step S56 whether a called terminal is a new destination terminal. If Y in step S56, i.e., if the called terminal is determined to be the destination terminal whose communication capability information is not stored in memory 10, step S58 is executed. If N is step S56, i.e., if the called terminal is determined to be the destination terminal whose communication capability information is stored in memory 10, the communication capability information of the called terminal is read out in step S61. Then, step S62 is executed.

In step S58, signal CED supplied and signal NSF or DIS including the communication capability information of the called terminal from the called terminal are received, and the communication capability information is stored in memory 10. Then, step S62 is executed.

In step S62, the communication capability information of the called terminal which is read out in step S61 or received in step S58 is compared with a capability of the calling terminal, and a communication mode is determined. If the communication capability of the calling terminal is changed and therefore is determined to differ from that stored in memory 10 of the called terminal in step S64, preparation for informing the called terminal that the communication capability of the calling terminal is changed is performed, i.e., the communication capability information of the calling terminal is written in signal NSS in step S66. If it is determined that the communication capability of the calling terminal is not changed in step S66, normal signal NSS is prepared.

Then, signal NSS is transmitted to the called terminal in step S68, and training is performed. Thereafter, signal TCF is transmitted from the calling to called terminal. At the called terminal, if the communication capability is changed, the changed communication capability information is written in signal CFR and transmitted to the calling terminal. When the communication capability is not changed, normal signal CFR is transmitted. When signal CFR includes the changed communication capability information, the answer is Y in step S70, and the changed communication capability information is stored in memory 10 of the calling terminal. If N in step S70, step S74 is executed.

when signal CFR is received, image data of an original is transmitted in step S74 until completion of transmission is determined in step S76. If completion of transmission is determined in step S76, whether the next page is present is determined in step S78. If the next page is present, steps S74 and S76 are repeated. If the next page is not present, an end-of-message signal EOM is transmitted to the called terminal in step S88. The called terminal generates message confirmation signal MCF. The calling terminal outputs disconnect signal DCN in response to signal MCF, thereby disconnecting the line.

As described above, according to this embodiment, when it is determined that communication can be performed by a new communication capability better than a previous communication capability, information for changing the communication capability is transmitted in a communication protocol executed between the calling and called terminals during communication, and the capabilities stored in the terminals can be updated. As a result, if the capabilities of both the calling and called terminals are improved, communication can be executed at higher speed with a higher function.

Note that in this embodiment, the changed communication capability of the called terminal is transmitted by signal CFR. However, the changed communication capability can be transmitted by message confirmation signal MCF. In this case, steps S70 and S72 are executed after step S78 with respect to signal MCF.

In the second embodiment, communication based on the changed communication capability is performed in the next communication. Therefore, a third embodiment in which communication based on the changed communication capability can be performed from current communication will be described with reference to FIG. 6. An arrangement of the third embodiment is similar to that of the second embodiment. However, in the third embodiment, not step S74 but step S62' is executed after a changed communication capability of a called terminal is stored in a memory in step S72. In step S62', processing similar to that in step S62 is executed, and then step S68 is executed. As a result, although a communication control sequence becomes more or less time-consuming in order to determine a new communication mode, communication can be performed on the basis of the changed communication capability.

Note that the present invention is not limited to the above embodiments. For example, in the above embodiments, information concerning the communication capability of a called terminal is stored. However, a communication mode determined between calling and called terminals may be stored in correspondence to the called terminal. Furthermore, various modifications can be made without departing from the spirit and scope of the present invention.

What is claimed is:

1. A facsimile apparatus capable of communicating image data with a destination facsimile apparatus, comprising:

storage means for storing communication mode information;

checking means for checking in response to an input transmission start instruction, whether communication with a destination facsimile apparatus is for the first time;

means for setting a communication mode based upon communication mode information transmitted from the destination facsimile apparatus when the communication with the destination facsimile apparatus is for the first time;

means for setting a communication mode based on a readout of a communication mode stored in said storage means when the communication with the destination facsimile apparatus is not for the first time said communication mode information being transmitted to the destination facsimile apparatus to be compared with a communication mode information of said destination facsimile apparatus;

means contained within said destination facsimile apparatus for returning a result of a comparison between the transmitted communication mode information and the actual communication mode information of said destination facsimile;

means for updating the communication mode information stored in said storage means based on communication mode information transmitted from the destination facsimile apparatus when the result of a comparison from said destination facsimile denotes a noncoincidence;

asking means for asking the destination facsimile apparatus when the communication with the destination facsimile apparatus is for the first time; and wherein said asking means further comprises means for transmitting communication mode information between the destination and transmitting facsimile apparatus using a non-standard set up signal and a digital command signal, timer means for counting a predetermined period of time; and second setting means for causing said timer means to start in response to a transmission start instruction and setting the optimum communication mode in accordance with communication mode information stored in said storage means when the new communication mode information is not received from the destination facsimile apparatus until after a predetermined period of time has elapsed.

2. A facsimile apparatus capable of communicating image data with a destination facsimile apparatus, comprising:

storage means for storing communication capability information;

checking means for checking in response to an input transmission start instruction whether communication with the destination facsimile apparatus is for the first time;

means for reading out the communication capability information from said storage means when the communication with the destination facsimile apparatus is not for the first time;

receiving means for receiving destination communication capability information representing capability of the destination facsimile apparatus when communication with the destination facsimile apparatus is for the first time;

comparing means for comparing a communication capability information with one of the read out communication capability information when the communication with the destination facsimile apparatus is for the first time, and the received destination communication capability information when the communication with the destination facsimile apparatus is not for the first time;

means for determining communication capability information from a comparison result, and updating the communication capability information stored in said storage means with the new communication capability information; means for setting a communication mode in accordance with one of the stored communication capability information and the determined new communication capability information; and data transmitting means for transmitting the image data to the destination facsimile apparatus in accordance with the set communication mode;

wherein the destination communication capability information is transmitted from the destination facsimile apparatus using a message confirmation signal.

3. A method for communication of image data with a destination facsimile apparatus, comprising the steps of:

checking in response to a communication start instruction whether communication with the destination facsimile apparatus is for the first time;

reading out communication capability information from a memory in order to set a communication mode based upon communication mode information stored in said memory when the communication with the destination facsimile apparatus is not for the first time;

receiving destination communication capability information from the destination facsimile apparatus in order to set a communication mode based upon received communication mode information from the destination facsimile apparatus when the communication with the destination facsimile apparatus is for the first time;

comparing intra communication capability information with one of the readout communication capability information and the received destination communication capability information;

determining new communication capability information based upon the comparison result;

updating the stored communication capability information with the new communication capability information;

setting a communication mode in accordance with one of the readout communication capability information and the received destination communication capability information;

detecting that the intra communication capability is changed when the intra communication capability information is different from one of the readout communication capability information;

transmitting image data to the destination facsimile apparatus in accordance with the communication mode; and wherein the destination communication capability information that is transmitted from the destination facsimile apparatus is transmitted using a message confirmation signal.

* * * * *